(12) United States Patent
Zhang et al.

(10) Patent No.: US 10,779,149 B2
(45) Date of Patent: Sep. 15, 2020

(54) METHODS AND ARRANGEMENTS FOR COMMUNICATION BETWEEN ADVERTISING AND ADVERTISEMENT RESPONDING WIRELESS DEVICES

(71) Applicant: Telefonaktiebolaget LM Ericsson (publ), Stockholm (SE)

(72) Inventors: Jingcheng Zhang, Norrköping (SE); Per Elmdahl, Linköping (SE); Thomas Rimhagen, Linköping (SE); Wei Shen, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 83 days.

(21) Appl. No.: 15/552,326

(22) PCT Filed: Mar. 31, 2015

(86) PCT No.: PCT/SE2015/050394
§ 371 (c)(1),
(2) Date: Aug. 21, 2017

(87) PCT Pub. No.: WO2016/159844
PCT Pub. Date: Oct. 6, 2016

(65) Prior Publication Data
US 2018/0041861 A1 Feb. 8, 2018

(51) Int. Cl.
*H04W 4/80* (2018.01)
*H04W 48/12* (2009.01)
*H04W 74/08* (2009.01)

(52) U.S. Cl.
CPC .............. *H04W 4/80* (2018.02); *H04W 48/12* (2013.01); *H04W 74/0833* (2013.01)

(58) Field of Classification Search
CPC combination set(s) only.
See application file for complete search history.

(56) References Cited

U.S. PATENT DOCUMENTS

| | | | |
|---|---|---|---|
| 2006/0013160 A1 | 1/2006 | Haartsen | |
| 2006/0039450 A1 | 2/2006 | Fulton et al. | |
| 2006/0173781 A1 | 8/2006 | Donner | |
| 2007/0051872 A1* | 3/2007 | Goldberg | G06Q 10/087 250/208.1 |

(Continued)

FOREIGN PATENT DOCUMENTS

WO 2006007946 A1 1/2006

OTHER PUBLICATIONS

Jones, A. et al., "The prototype embedded network (PEN)", Computer Networks 35, 2001, pp. 377-390.

*Primary Examiner* — Ganiyu A Hanidu
(74) *Attorney, Agent, or Firm* — Coats + Bennett, PLLC (57) ABSTRACT

An advertising wireless device (110) broadcasts (202; 802) an advertising message over a wireless communication link (115). The advertising wireless device receives (203a; 803), from an advertisement responding device (120-1), a request message that was sent by the advertisement responding device (120-1) at a certain point in time in response to the broadcasted advertising message. Said certain point in time being randomized within a listening time period during which the advertising wireless device (110) listens for a response to the broadcasted advertising message and is able to receive the request message.

17 Claims, 6 Drawing Sheets

(56) References Cited

U.S. PATENT DOCUMENTS

| | | | |
|---|---|---|---|
| 2012/0327920 A1* | 12/2012 | Xhafa | H04W 74/0808 |
| | | | 370/338 |
| 2013/0107703 A1 | 5/2013 | Cherian et al. | |
| 2013/0109313 A1* | 5/2013 | Kneckt | H04W 8/005 |
| | | | 455/41.2 |
| 2013/0136046 A1* | 5/2013 | Wurm | H04W 48/16 |
| | | | 370/311 |
| 2013/0295921 A1 | 11/2013 | Bhargava et al. | |
| 2015/0156808 A1* | 6/2015 | Brantner | G06F 3/04883 |
| | | | 455/41.2 |
| 2015/0256968 A1* | 9/2015 | Terazaki | H04W 76/10 |
| | | | 455/41.2 |

\* cited by examiner

| Length | Type | Value |
|---|---|---|

METHODS AND ARRANGEMENTS FOR COMMUNICATION BETWEEN ADVERTISING AND ADVERTISEMENT RESPONDING WIRELESS DEVICES

TECHNICAL FIELD

Embodiments herein relate to methods and arrangements regarding communication between advertising and advertisement responding wireless devices over a wireless communication link, such as a low power, short range wireless communication link, e.g. based on Bluetooth® Low Energy.

BACKGROUND

Communication devices such as wireless devices may also be known as e.g. user equipments (UEs), mobile terminals, wireless terminals and/or mobile stations. A wireless device is enabled to communicate wirelessly in a wireless communication network and/or over a radio link, with another wireless device and/or radio network node. A wireless device may further correspond to and/or be referred to as a mobile telephone, cellular telephone, laptop, Personal Digital Assistant (PDA), tablet computer, a mobile station, a mobile terminal or a wireless terminal, a mobile phone, a computer such as e.g. a laptop, a Personal Digital Assistants (PDAs) or a tablet computer, sometimes referred to as a surf plate, with wireless capability, a so called Machine to Machine (M2M) device or Machine Type of Communication (MTC) device, e.g. a sensor, i.e. devices that are not associated with a conventional user. A wireless device may be in principle any device or unit capable to wirelessly communicate over a radio link, e.g. in a wireless communication network. The wireless device may be, for example, portable, pocket-storable, hand-held, computer-comprised, or vehicle-mounted mobile device, enabled to communicate voice and/or data, with another entity, such as another wireless device or a server.

Bluetooth® is a wireless communication technology for exchanging data over short distances. Bluetooth Low Energy (BLE) is a wireless technology for so called Personal Area Networks (PAN) and is designed by the Bluetooth Special Interest Group (SIG) aimed at novel applications in the healthcare, fitness, security, and home automation industries. Compared to Classic Bluetooth, BLE is intended to provide considerably reduced power consumption and cost while maintaining a similar communication range. On the other hand, the amount of data being transmitted by BLE is much less than Classic Bluetooth. BLE is e.g. described in Bluetooth Core Specification 4.2, and is also marketed under the mark Bluetooth® Smart.

The BLE advertising scheme allows a BLE supporting device to periodically broadcast application related data in a predefined format. Four different types of advertisement are utilized in BLE: connectable undirected advertisement (ADV_IND), connectable directed advertisement (ADV_DIRECT_IND), non-connectable undirected advertisement (ADV_NONCONN_IND) and scannable undirected advertisement (ADV_SCAN_IND). Except from ADV_NONCONN_IND, all other advertisements can either be used to explore further information (via so called Scan Request, SCAN_REQ) or create a BLE connection (via so called Connect Request, CONNECT_REQ). Typically, after sending an advertisement, a BLE advertising device turns on a receiver and waits for a short interval to receive reply packets. If a valid packet is received during this interval, the device starts packet processing immediately.

A recipient of the advertisement may in BLE be a so called active scanner, or simply scanner, or a so called initiator. When a scannable advertisement is received, an active scanner sends said Scan Request to the advertiser after an Time interval of Inter-Frame-Space (T_IFS), which is 150 us. No collision avoidance mechanism is defined for BLE message transmission. A back-off algorithm is utilized when an active scanner fails to receive the Scan Response from the advertiser. In the case of an initiator, a Connect Request is sent to the advertiser after T_IFS. According to the specification, an initiator believes the connection is created after the connect request sent to the advertising device, no acknowledgement is needed in this case. However, if the connection failed, it takes 6 times the connection interval, which is defined in the Connect Request.

New usage areas, usage scenarios and applications involving BLE are believed to rapidly grow in a close future. For example, many usage areas and scenarios will likely involve a large amount of different active scanners and/or initiators that want to communicate with one and the same advertiser or at least a smaller amount of advertisers. It is desirable that BLE should be able to manage and robustly support such scenario.

SUMMARY

An object is to provide one or more improvements with regard to communication between advertising and advertisement responding wireless devices over a low power, short range wireless communication link, such as a wireless communication link based on Bluetooth® Low Energy (BLE).

According to a first aspect of embodiments herein, the object is achieved by a method, performed by an advertising wireless device for communicating with one or more advertisement responding wireless devices over a wireless communication link. The advertising wireless device broadcasts an advertising message over the wireless communication link. Further, the advertising wireless device receives, from an advertisement responding device, a request message that was sent by the advertisement responding device at a certain point in time in response to the broadcasted advertising message. Said certain point in time being randomized within a listening time period during which the advertising wireless device listens for a response to the broadcasted advertising message and is able to receive the request message.

According to a second aspect of embodiments herein, the object is achieved by a computer program comprising instructions that when executed by a processing circuit causes the advertising wireless device to perform the method according to the first aspect.

According to a third aspect of embodiments herein, the object is achieved by a data carrier comprising the computer program according to the second aspect.

According to a fourth aspect of embodiments herein, the object is achieved by a method, performed by an advertisement responding wireless device for communicating with an advertising wireless device over a wireless communication link. The advertisement responding wireless device receives, from the advertising device, an advertising message broadcasted by the advertising device over the wireless communication link. The advertisement responding wireless device sends, to the advertising device at a certain point in time, a request message in response to the received advertising message. Said certain point in time being randomized within a listening time period during which the advertising wireless device listens for a response to the broadcasted advertising message and is able to receive the request message.

According to a fifth aspect of embodiments herein, the object is achieved by a computer program comprising instructions that when executed by a processing circuit causes the advertisement responding wireless device to perform the method according to the fourth aspect.

According to a sixth aspect of embodiments herein, the object is achieved by a data carrier comprising the computer program according to the fifth aspect.

According to a seventh aspect of embodiments herein, the object is achieved by an advertising wireless device for advertising wireless device for communicating with one or more advertisement responding wireless devices over a wireless communication link. The advertising wireless device is configured to broadcast an advertising message over the wireless communication link. The advertising wireless device is further configured to receive, from an advertisement responding device, a request message that was sent by the advertisement responding device at a certain point in time in response to the broadcasted advertising message. Said certain point in time being randomized within a listening time period during which the advertising wireless device listens for a response to the broadcasted advertising message and is able to receive the request message.

According to an eight aspect of embodiments herein, the object is achieved by an advertisement responding wireless device for communicating with an advertising wireless device over a wireless communication link. The advertisement responding wireless device is configured to receive, from the advertising device, an advertising message broadcasted by the advertising device over the wireless communication link. The advertisement responding wireless device is further configured to send, to the advertising device at a certain point in time, a request message in response to the received advertising message. Said certain point in time being randomized within a listening time period during which the advertising wireless device listens for a response to the broadcasted advertising message and is able to receive the request message.

By randomizing said certain time point where request messages are sent within said listening time period, the risk of colliding and interfering responses is greatly reduced. Thereby less errors in and a more robust communication is enabled. The randomization will send the request message with a random response offset, i.e. the certain point in time will be random offset compared to point in time when a conventional request message according to BLE would be sent, which would be more or less directly in response to that the advertising message had been received.

BRIEF DESCRIPTION OF THE DRAWINGS

Examples of embodiments herein are described in more detail with reference to the appended schematic drawings, which are briefly described in the following.

DETAILED DESCRIPTION

As a development towards embodiments herein, the situation indicated in the Background will first be further discussed.

It has been identified that Bluetooth® Low Energy (BLE) may be associated with operational problems when multiple devices, e.g. either active scanners or initiators, try to communicate with one advertiser at the same time. For example, multiple active scanners or initiators may more or less simultaneously send requests after receiving one and the same broadcasted advertisement. In this case, these requests have a great risk of interfering with each other since the devices likely will attempt to send messages at substantially the same time. Since interfered packets will typically not pass Cyclic Redundancy Checks (CRCs), these packets will be discarded by the BLE link layer. From the scanner or initiator point of view, this will look like as if the advertiser did not respond to the request. A possible solution involves retries, but the performance can be severely impacted by this. For example, it may take up to 10.24 seconds before an active scanner has a next chance to send a scan request.

Another problem that has been identified is that present BLE advertising schemes may be vulnerable to denial-of-service attacks, where an advertiser becomes prohibited from communicating with any scanner or initiator. For example, a malicious node with three RF radio sources, corresponding to three advertising channels, can easily be implemented and placed in a BLE deployment area. When the malicious node receives an advertising packet, it may immediately send a scan request to the advertiser. After the scan request processing, the advertiser will then either move to a next advertising channel or stop an ongoing advertising event no matter if the received scan request is allowed by an advertising policy or not. As a result, if the malicious node keeps sending scan requests in response to all to all received scannable or connectable advertisements, the malicious node can easily stop or at least reduce the communication between advertisers and scanners or initiators within its radio propagation range.

The following is a brief example of a solution, based on embodiments herein, for solving the above-mentioned problems. A BLE advertiser may start listening and be ready to receive after the advertisement is sent. Then, instead of immediately start processing the first received request, such as a SCAN_REQ or CONNECT_REQ, the advertiser may keep listening for a certain time interval that may be named $\Delta t$. After a listening period, all received packets during the time interval $\Delta t$ are reported to an upper layer for further processing. A value specifying $\Delta t$ may e.g. be included in the advertisement and/or be known in advance by the advertiser and scanner or initiator. Upon receiving an advertisement, a scanner or initiator should wait a random interval within, i.e. shorter than, $\Delta t$ before sending the SCAN_REQ or CONNECT_REQ to the advertiser.

By introducing said random interval, corresponding to an offset, the risk of interfering message collision as describe above is largely reduced, which is especially advantageous in an area where BLE devices are densely deployed.

By listening and receiving during the time interval $\Delta t$ instead of directly processing the first received request, a BLE advertiser is enabled to handle multiple received requests from different devices, i.e., active scanners or initiators, during a single listening period and thereby become less vulnerable to such denial-of-service attacks as described above.

Hence, embodiments herein improves the robustness of prior art BLE advertising schemes and reduces the impact of a possible denial-of-service attack.

Embodiments herein will now be described in some further detail with support from the drawings.

Figure 1:
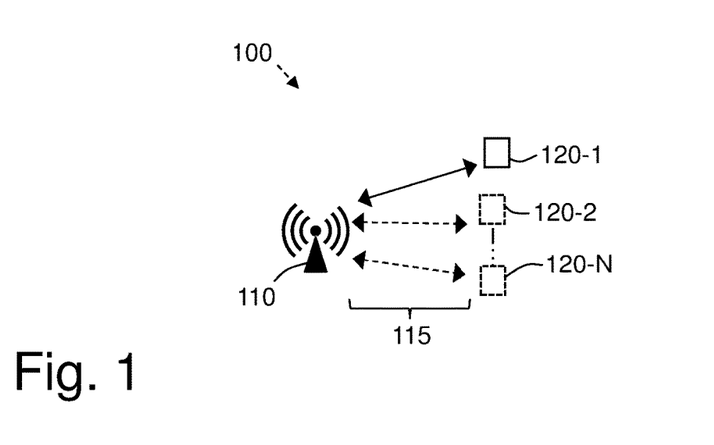
FIG. 1 is a block diagram schematically depicting an example of a communication system in which embodiments herein may be implemented.

FIG. 1 is a block diagram schematically depicting wireless devices for communication with each other. The shown wireless devices comprises an advertising wireless device 110, e.g. a BLE advertiser and an advertisement responding wireless device 120-1, e.g. a BLE active scanner or initiator, for communication with the advertising wireless device 110 over a wireless communication link 115. The wireless communication link is thus a link for wireless, or radio, communication. The wireless communication link 115 is typically a low power, short range wireless communication link, such as used in BLE, and may thus be based on BLE or be a BLE wireless communication link.

As used herein, by low power wireless communication link is generally meant that there is an upper limit associated with, e.g. of allowed and/or specified for and/or that restricts, transmit power over the communication link, and that this upper limit is comparatively low, e.g. compared to allowable transmit power according to other wireless communication technologies than of the wireless communication link. For example, Bluetooth and BLE use low power wireless communication links that, as recognized by the skilled person, are associated with substantially lower transmit power than e.g. base stations and user equipments in conventional wireless communication networks for telecommunication, e.g. based on Long Term Evolution (LTE). For example, the upper trait power limit associated with the wireless communication link 115 may be e.g. 10 dBm, although normally even lower transmit power is used.

As realized, the low power also restricts the communication range. However, communication range of a wireless communication link is also dependent on other factors associated with the wireless communication link, such as coding scheme, how communication errors are handled, interference and noise robustness, receiver sensitivity etc.

In any case, as used herein, by short range wireless communication link is generally meant that there is an upper communication range or distance associated with a satisfying or working communication over the wireless communication link, and that this range is comparatively short, e.g. compared to communication ranges according to other wireless communication technologies than of the wireless communication link. For example, Bluetooth and BLE have short communication range, as recognized by the skilled person, compared to communication ranges between base stations and user equipments in LTE. For example, the upper communication range associated with the wireless communication link 115 may e.g. be in the magnitude of one or a few hundred meters, such as 500 m, possibly up to e.g. 1 km, such as when a highest allowable transmit power is used and there is more or less perfect environmental circumstances, line of sight etc.

Further, the wireless communication link 115 may, as in BLE, comprise or correspond to a logical connection over a multiplexed medium e.g. channel(s). For example, there are currently 40 BLE communication channels defined where 3 of them are allocated for advertisement usage. There may be any number of wireless communication links in one channel and hence links may share channel. More than one channel may be utilized by a communication link, i.e. there may be channel hopping. Hence, the communication link 115, or rather a logical connection of, e.g. corresponding to, the communication link, may be multiplexed over shared channels(s) or medium, i.e. the logical connection may be over a multiplexed medium.

As used herein, by advertising wireless device 110, is meant a wireless device that wirelessly transmits, i.e. sends out, e.g. by broadcasting, advertisement messages to be responded to by one or more advertisement responding wireless devices, e.g. the advertisement responding wireless device 120-1, in order to further communicate with the by advertising wireless device 110, such as receiving and/or sending information from/to the advertising wireless device 110.

There may also be one or more additional advertisement responding devices 120-2 . . . 120-N for communication with the advertising wireless device 110. The reference numerals 120-2 . . . 120-N, are intended to identify a total number of N-1 wireless devices, where N is an integer value greater than or equal to 2. The one or more additional advertisement responding devices 120-2 . . . 120-N may e.g. be BLE active scanners and/or initiators, and also communicate with the advertising wireless device 110 over the communication link 115, i.e. in other words share the communication link 115 with the advertisement responding wireless device 120-1.

The may be part of, i.e. be comprised in, a local communication network 100, e.g. a Personal Area Network (PAN) 100, that may also may be named a Wireless PAN (WPAN). As used herein, by local communication network is meant a network where communication is taking part over one or more communication links, such as the communication link 115. A PAN is a communication network typically associated with short range communication links as described above and used for data transmission among and between devices where at least one typically, but not necessary, is associated with a person. PANs may be used for communication between, e.g. among, the devices themselves, e.g. intrapersonal communication, and/or for connecting to a higher level network and e.g. the Internet. Bluetooth® is an example of a technology that is used for setting up WPANs.

Attention is drawn to that FIG. 1 is only schematic and for exemplifying purpose and that not everything shown in the figure may be required for all embodiments herein, as will be evident to the skilled person. Also, in practise, the shown devices may in turn connect to respective further devices, nodes and/or networks, as realized by the skilled person, but which are not shown herein for the sake of simplifying.

Figure 2:
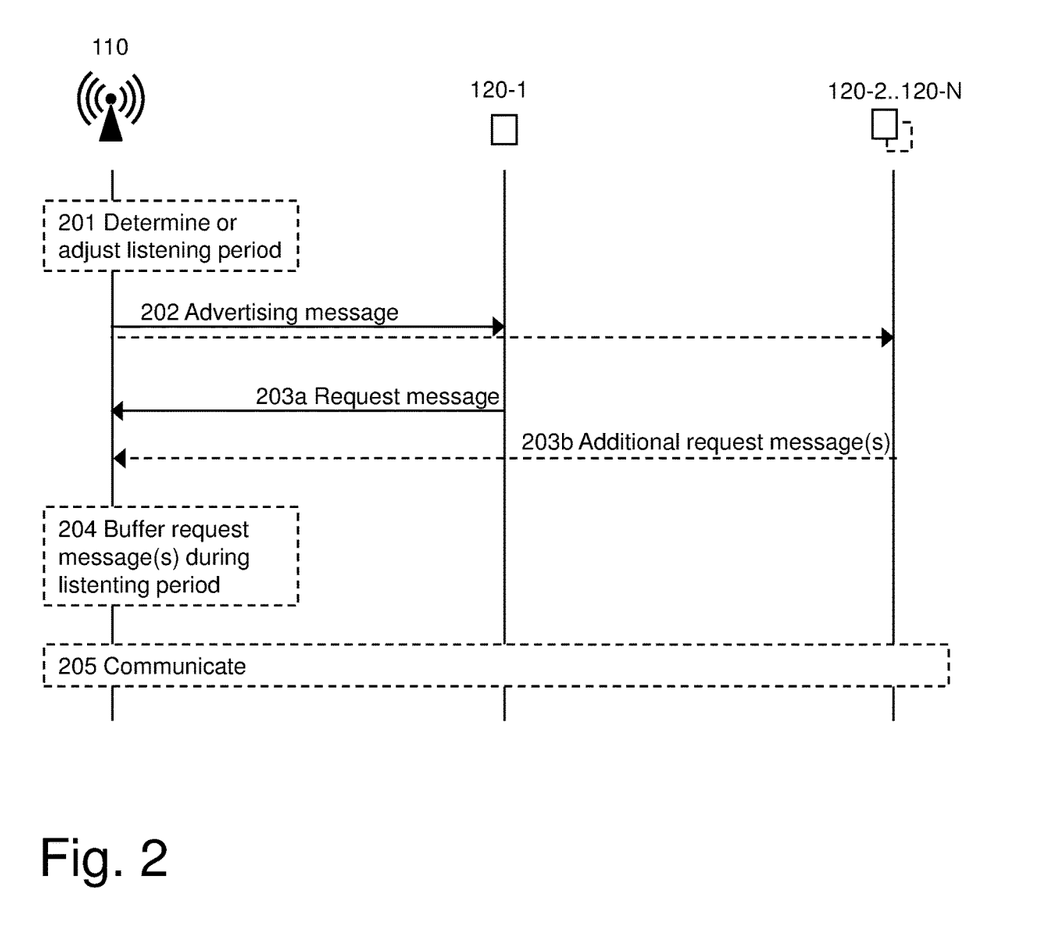
FIG. 2 is a combined signaling diagram and flowchart for describing embodiments herein.

FIG. 2 depicts a combined signaling diagram and flowchart and will be used to discuss examples of embodiments of a method, and related examples, for communication between the advertising wireless device 110, the advertisement responding wireless device 120-1 and the one or more further advertisement responding wireless device 120-2 . . . 120-N over the wireless communication link 115.

The method comprises the following actions, which actions may be taken in any suitable order and/or be carried out fully or partly overlapping in time when this is possible and suitable.

Action 201

The advertising wireless device 110 may determine a listening time period Δt based on load and/or interference associated with the wireless communication link 115.

Additionally or alternatively, the listening time period may be based on a predefined and/or predetermined value, and may be adjusted in the present action.

The listening time period Δt is a time period during which the advertising wireless device 110 listens for a response to a broadcasted advertising message and is able to receive a request message in response to the broadcasted advertising message, see e.g. Action 203 below.

Note that a message, e.g. the advertising message and the request message, in the context of embodiments herein may be in the form of a packet.

The listening time period Δt may be determined by adjustment and/or modification of an initial and/or default value that in turn may be predefined and/or predetermined. For example, in case of increased load and/or interference, the listening time period Δt may be increased from a present value that when starting may be said initial and/or default value. In case of decreased load and/or interference, the listening time period Δt may be decreased from a present value, e.g. towards the initial and/or default value that may correspond to a minimum listening time period. The advertising wireless device 110, e.g. a BLE advertiser, may measure interference based on CRCs.

The advertising wireless device 110 may additionally or alternatively provide, e.g. determine, the listening time period Δt based on a predetermined and/or predefined value.

The listening time period Δt will be further discussed and explained below.

Action 202

The advertising device 110 broadcasts an advertising message over the wireless communication link 115, i.e. on radio frequencies associated with the wireless communication link 115. The advertisement responding wireless device 120-1 receives the broadcasted advertising message. Also the one or more additional advertisement responding wireless devices 120-2 . . . 120-N may receive the broadcasted advertising message.

The broadcasted message may be named ADV_IND or ADV_SCAN_IND in BLE. The latter may be used when establishing a connection is not supported by the advertiser, i.e. here corresponding to the advertising device 110, and e.g. only active scanners are supported.

The listening time period Δt should typically not exceed a maximum time associated with the advertising message, i.e. a time after broadcast of the advertising message where it will be assumed that no response to it will be received and e.g. a new advertisement message will be broadcasted instead. In BLE this maximum time may be 10 ms.

Further, the listening time period determined and/or provided in Action 201 may be comprised in, or at least be sent with, the advertising message. For example, a value determining the listening time period may be comprised in the advertising message, e.g. in the case of BLE in accordance with any of the detailed examples discussed below with reference to FIGS. 3-4. More generally, the advertising message may comprises information identifying the listening time period Δt.

After the advertising device 110 has broadcasted the advertising message it listens during the listening period Δt for request messages in response to the broadcasted advertising message. The listening time period Δt may start when a waiting time interval, e.g. as Time interval of Inter-Frame-Space (T_IFS) in BLE, has passed after the advertising wireless device 110 stopped broadcasting the advertising message. The advertising wireless device 110 may start listening for requests in response to the broadcasted advertising message, e.g. entering a listening mode, slightly before the waiting time interval has ended.

Action 203a

The advertisement responding wireless device 120-1, sends, to the advertising device 110 at a certain point in time, a request message in response to the advertising message received in Action 202. Said certain point in time being randomized within the listening time period Δt during which the advertising wireless device 110 listens for a response to the broadcasted advertising message and is able to receive the request message. The advertising wireless device 110 receives the request message within the listening time period Δt.

The advertisement responding wireless device 120-1, and also the one or more additional advertisement responding wireless devices 120-2 . . . 120-N, may have knowledge of the listening time period Δt since it was received with the advertising message, or the listening time period Δt may be known in advance e.g. by being predetermined and/or predefined.

Further, the listening time period Δt may be known to start when said waiting time interval, e.g. T_IFS in BLE, has passed after the advertising wireless device 110 has stopped broadcasting the advertising message in action 202.

In BLE, the request message in this action may be named SCAN_REQ when the advertisement responding wireless device 120-1 corresponds to an active scanner, or CONNECT_REQ when the advertisement responding wireless device 120-1 corresponds to an initiator.

Action 203b

Some or all of the one or more additional advertisement responding wireless devices 120-2 . . . 120-N may also send request messages to the advertising device 110 that receives these. The request messages are sent individually at certain points in time, each certain point being randomized within the listening time period Δt, i.e. similar as in Action 203a. Hence, all request messages sent to and received by the advertising device 110 in Actions 203a-b are individually randomized in time and are thereby received by the advertising device 110 at different randomized points in time during the listening time period Δt.

Action 204

The advertising wireless device 110 may buffer, during the listening time period Δt, all received request messages from Actions 203a-b. As recognized by the skilled person, buffering implies storing in memory for later use, typically locally, easily accessible and temporary.

Action 205

After lapse of said listening period and in response to at least one of said buffered request messages in Action 204, the advertising wireless device 110 may communicate with at least one of the advertisement responding device 120-1 and the one or more additional advertisement responding devices 120-2 . . . 120-N. Communication with any one of the advertisement responding devices 120-1 . . . 120-N in the present action is thus based on that the advertising wireless device 110 has received a request message from this device in Action 203a or Action 203b, and buffered it in Action 204.

The communication in this action may comprise that the advertising wireless device 110 sends and/or receives data to/from the advertisement responding wireless device 120-1 in response to that it has received and buffered the request message from this device.

In case of BLE and the advertising wireless device 110 being an advertiser, and the advertisement responding wireless device 120-1 being an active scanner, the advertising wireless device 110 may wait T_IFS after the listening period has ended and then send the data in a message named SCAN_RSP to the advertisement responding wireless device 120-1.

In case of BLE and the advertising wireless device 110 being an advertiser, and the advertisement responding wireless device 120-1 being an initiator, the advertisement responding wireless device 120-1 become a master in response to that it has sent the request message, named CONNECT_REQ, to the advertising wireless device 110 that become a slave. The advertisement responding wireless device 120-1, i.e. the initiator and master in this case, may send a master to slave message (M→S) with data when the advertising wireless device 110, i.e. the advertiser and slave in this case, has a TxWindow. The start of the TxWindow is conventionally determined by a conventional WinOffset time identified by a value in a field of the CONNECT_REQ request message. In embodiments herein, a new WinOffset time may be used instead of the conventional WinOffset time, the new WinOffset time being based on the listening time period Δt and the conventional WinOffset time, e.g. so that the TxWindow is delayed compared to a conventional case to take into account the delay introduced by the randomized point in time discussed above in connection with Actions 203a-b. The TxWindow and WinOffset will be further discussed and exemplified below in connection with FIG. 7. For embodiments where the listening time period Δt is determined by adjustment and/or modifications, as discussed above under Action 202, the adjustments and/or modification may alternatively or additionally be performed by the advertisement responding wireless device 120-1 when being initiator and master, and may be based on load and/or interference associated with the wireless communication link 115. Hence, the present action may comprise that the advertisement responding wireless device 120-1 sends information commanding the advertising wireless device 110 to adjust the listening time period, e.g. based on load and/or interference associated with the wireless communication link 115. The load may be such experienced by the advertisement responding wireless device 120-1.

By randomizing said certain time point where request messages are sent within said listening time period Δt, the risk of colliding and interfering responses is greatly reduced. Thereby less errors in and a more robust communication is enabled. The randomization will send the request message with a random response offset, i.e. the certain point in time will be random offset compared to point in time when a conventional request message would be sent, which would be more or less directly in response to that the advertising message had been received.

The randomized response offset, e.g. if all advertisement responding wireless device 120-1 had to implement this, also makes it much more difficult for someone to succeed with such malicious and detrimental attacks, e.g. denial-of-service attacks, as described in the above Background. In other words, embodiments herein enable more robust and thus improved communication over the wireless communication link, e.g. based on BLE.

Further, by the listening, receiving and buffering during the listening time period Δt instead of directly processing the first received request, the advertising wireless device 110, e.g. BLE advertiser, is enabled to handle multiple received requests from different advertisement responding wireless device 120-1 . . . 120-N, e.g. active scanners or initiators, during a single listening time period Δt. This way detrimental requests can be found and avoided and thereby the advertising wireless device 110 become less vulnerable to such denial-of-service attacks as described above. Hence, thanks to embodiments herein, even in case of such denial-of-service attacks as described above, non-malicious advertisement responding wireless devices are able to respond and normal traffic may flow, however somewhat impaired because the listening time period Δt causes a delay compared to a conventional situation.

Figure 3:
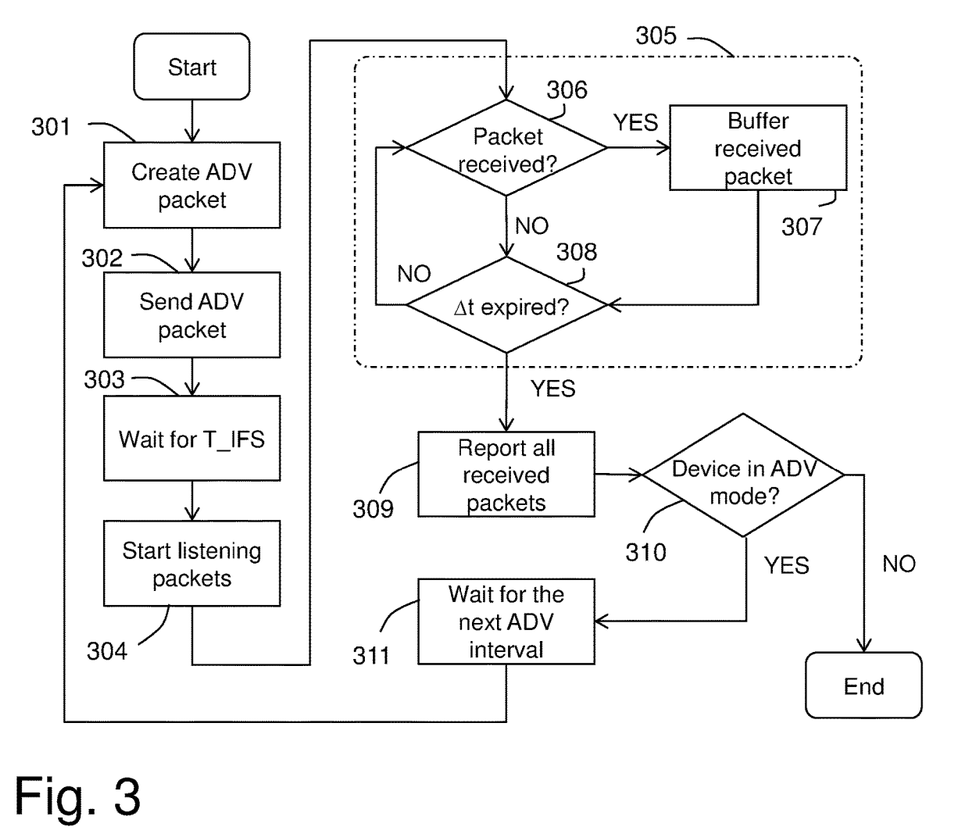
FIG. 3 is a flowchart for schematically illustrating embodiments herein in a Bluetooth® Low Energy (BLE) context.

FIG. 3 is a flowchart for schematically illustrating embodiments herein from perspective of the advertising wireless device 110 in a BLE context, i.e. when the advertising wireless device 110 is a BLE advertiser.

The advertising wireless device 110 creates, in an action 301, an advertisement (ADV) packet that may comprise information about the listening time period Δt, and then broadcasts the advertisement packet in an action 302. The advertising wireless device 110 waits a time interval of T_IFS in an action 303 and that starts receiving packets in an action 304. A dashed block 305 in the figure indicates some actions specific for embodiments herein. These actions comprise an action 306 where it is checked during the listening time period Δt if any packets are received, i.e. packets, such as a SCAN_REQ or CONNECT_REQ, corresponding to requests, received in response to the broadcasted advertisement packet. If/when a packet is received, the packet is buffered in an action 307. Further, it is checked in an action 308 if the listening time period Δt has expired, i.e. has ended. If this is the case, the advertising wireless device 110, in an action 309, reports, or take action upon, all the received packets, i.e. at this point the buffered packets, to an upper layer for further processing or action, e.g. for determining which packets shall be responded to, and which that can and/or should be ignored. The upper layer thus has the chance to choose one or more most important packets for the further processing. In any case, it is then checked, in an action 310, if the advertising wireless device 110 is in an ADV mode or state, i.e. in an advertising mode or state where advertising shall continue. If this is the case, the advertising wireless device 110 waits for a next ADV interval, i.e. advertising interval, in an action 311. Thereafter the action 301 is performed again, i.e. it all restarts, a new ADV packet is created, etc.

It may be realized that the above and what is shown in FIG. 3 reduce the impact of denial-of-service attacks. For example, a protocol stack of the advertising wireless device 110 may make sure to send only one response per broadcasted advertisement packet, or one response per advertisement responding wireless device 120-1 and per broadcasted advertisement packet, i.e. so there at most will be one response per advertisement responding wireless device 120-1 that has responded to the broadcasted advertisement.

Figure 4:
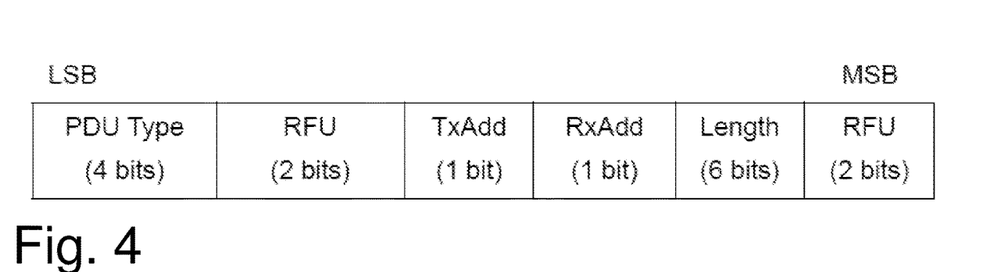
FIG. 4 is a schematic block representation exemplifying a BLE advertisement header format.

FIG. 4 is a schematic block representation exemplifying a BLE advertisement header format. Information identifying the listening time period Δt can be included into an advertisement packet by using fields that are Reserved-for-Future-Usage (RFU), i.e. one or more RFU fields, in an already existing advertisement packet header. In the figure, two 2-bit RFU fields are shown. The information about the listening time period Δt can be added in either one of two RFU fields. Since each field contains two bits, the information identifying the listening time period Δt may be categorized in 4 different intervals. For example, 00 may represent that Δt is 0, i.e. no interval at all, i.e. as conventionally. 01 may represent 2 ms, 10 may represent 4 ms and 11 may represents 8 ms.

Figure 5:
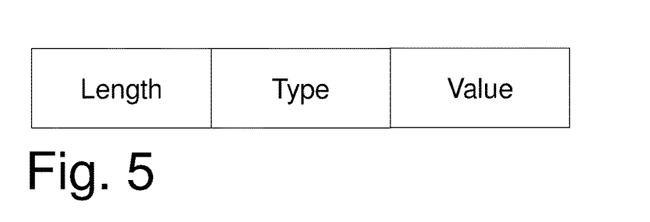
FIG. 5 is a schematic block representation exemplifying a BLE offset information advertisement data format.

FIG. 5 is a schematic block representation exemplifying a BLE offset information advertisement data format. Information identifying the listening time period Δt may be comprised in, i.e. be part of, broadcasted advertisement data. The advertisement data format may follow a standard length-type-value format defined by a so called Generic Access Profile (GAP), which is shown in the figure. Compared with using the RFU fields as discussed above, sending the information with the advertisement data enable higher flexibility.

For example, a media access method, such as contention based or TDMA based, associated with the advertisement may be identified by also letting such information be identified by information in the advertisement data.

Figure 6:
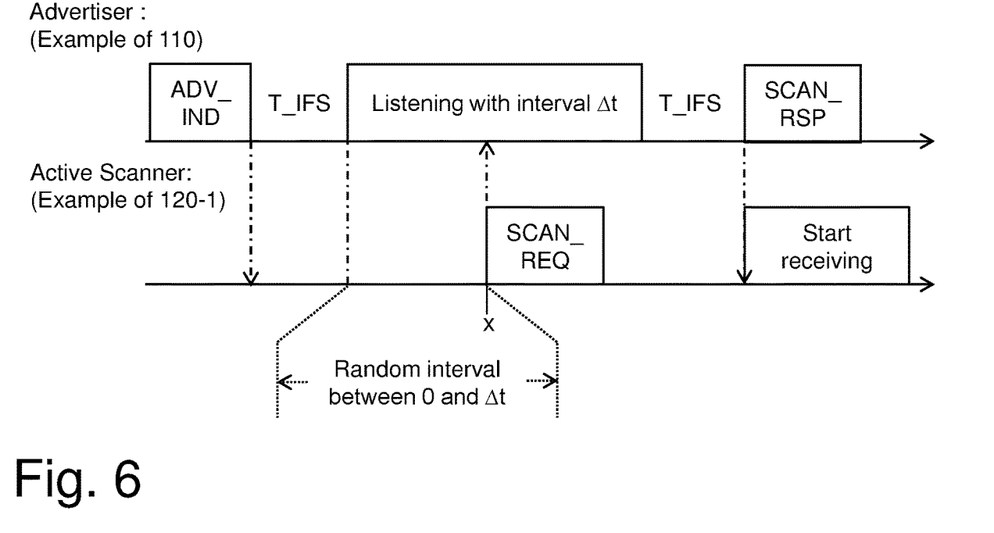
FIG. 6 shows time diagrams for schematically illustrating embodiments herein with regard to a BLE procedure involving an active scanner and advertiser.

FIG. 6 shows time diagrams for schematically illustrating embodiments herein with regard to a BLE procedure involving an active scanner and advertiser. FIG. 6 illustrates an exemplifying advertisement handling procedure of the advertisement responding wireless device 120-1 when it corresponds to a BLE active scanner. In FIG. 6 and in the following text relating to FIG. 6, the advertisement responding wireless device 120-1 is named active scanner and the advertising wireless device 110 is named advertiser since these are names used in BLE. What is shown in the figure should be rather self-explanatory but will be briefly commented and explained in the following. The active scanner receives an advertisement packet, ADV_IND, broadcasted by the advertiser and comprising information identifying the listening time period Δt. This fully or partly corresponds to action 202 above. The active scanner waits a random interval x between 0 and Δt before the scan request, SCAN_REQ, is sent to the advertiser. This fully or partly corresponds to action 203 above.

With reference to the text above in connection with FIG. 2, see in particular Action 203a, and said randomized certain time point in the listening time period Δt, this randomized certain point in time corresponds to x in FIG. 6 and thus defines a random interval in the listening time period between 0 and x. The above mentioned listening time period Δt during which the advertising wireless device listens for a response to the broadcasted advertising message and can receive the request message, is identifiable in FIG. 6 as Δt minus the duration of the request message SCAN_REQ, since the advertiser must be able to receive this message within Δt. In other words, although x corresponds to a randomized point in time it should be randomized within listening time period Δt and early enough so that the SCAN_REQ is able to be received by the advertiser during the listening time period Δt.

A scan response message, SCAN_RSP, is further shown in FIG. 6. This fully or partly corresponds to action 205 above. A scan response time associated with it can easily be identified as Δt plus two T_IFS after the ADV_IND was received. Practically, a receiver of the active scanner is always on during a scan window, e.g. after a scan request, SCAN_REQ, has been sent to the advertiser in response to the received ADV_IND.

Figure 7:
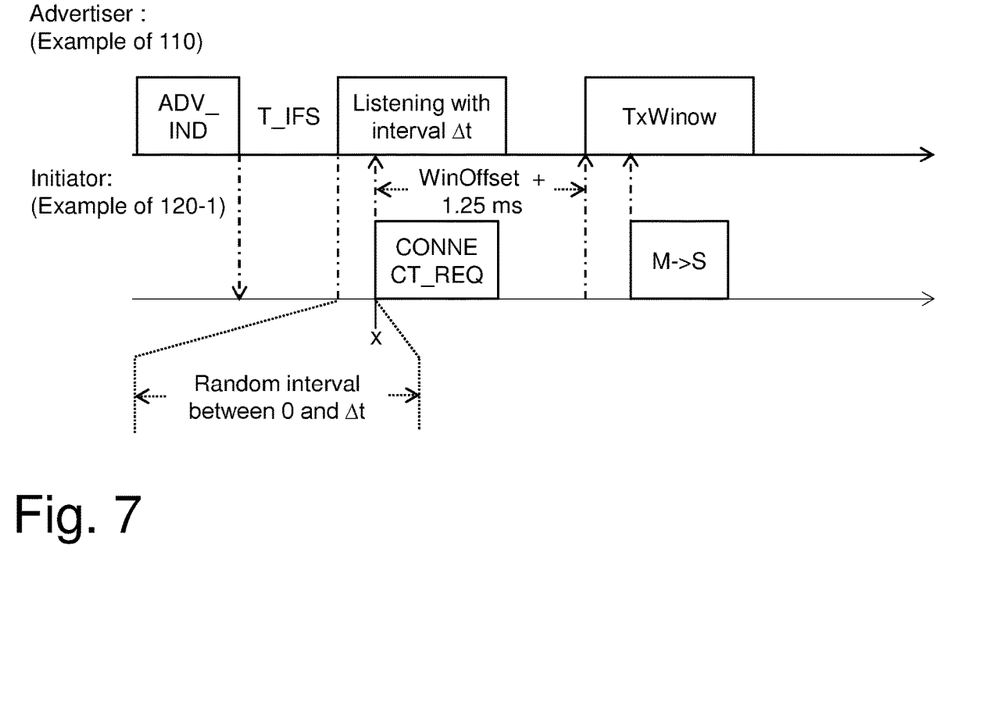
FIG. 7 shows time diagrams for schematically illustrating embodiments herein with regard to a BLE procedure involving an initiator and advertiser.

FIG. 7 shows time diagrams for schematically illustrating embodiments herein with regard to a BLE procedure involving an initiator and advertiser. FIG. 7 illustrates an exemplifying advertisement handling procedure of the advertisement responding wireless device 120-1 when it corresponds to a BLE initiator. In FIG. 7 and in the following text relating to FIG. 7, the advertisement responding wireless device 120-1 is named initiator and the advertising wireless device 110 is named advertiser since these are names used in BLE. What is shown in the figure should be rather self-explanatory but will be briefly commented and explained in the following, focusing mainly on differences compared to FIG. 6.

Similar to the active scanner, discussed above in connection with FIG. 6, the initiator waits a random interval x between 0 and Δt before it sends a request, here a connect request, CONNECT_REQ, to the advertiser. Note that although x corresponds to a randomized point in time it should be randomized within listening time period Δt and early enough so that the CONNECT_REQ is able to be received by the advertiser during the listening time period Δt.

The WinOffset mentioned above in connection with FIG. 2 and Action 205 is shown in the figure and corresponds to an offset interval that a BLE slave, here the advertiser, in a connection needs to wait before the start of the TxWindow mentioned above, i.e. a time interval within which a first data packet with master to slave data, M→S, should be sent from a BLE master, here the initiator, to the BLE slave, here the advertiser. As mentioned, the WinOffset is identified in a field in the CONNECT_REQ and typically needs to be calculated to make sure that the advertiser is waiting in the TxWindow when the first data packet, M→S, is sent from the master to the slave. The TxWindow may start a time period corresponding to the WinOffset plus a predetermined delay, conventionally 1.25 ms, after the CONNECT_REQ request message was sent. As mentioned above, a new WinOffset may be used in embodiments herein to take into account the delay caused by the randomization and that action upon received request messages should wait until after lapse of the listening time period Δt. The new WinOffset may be based on adding the listening time period Δt to a conventional WinOffset that would be used without the introduced delay caused by the randomization. At least it should be made sure that the TxWindow begin after lapse of the listening time period Δt, e.g. after a certain delay thereafter, and that the TxWindow does not interfere with other communication over the wireless communication link 115.

Figure 8:
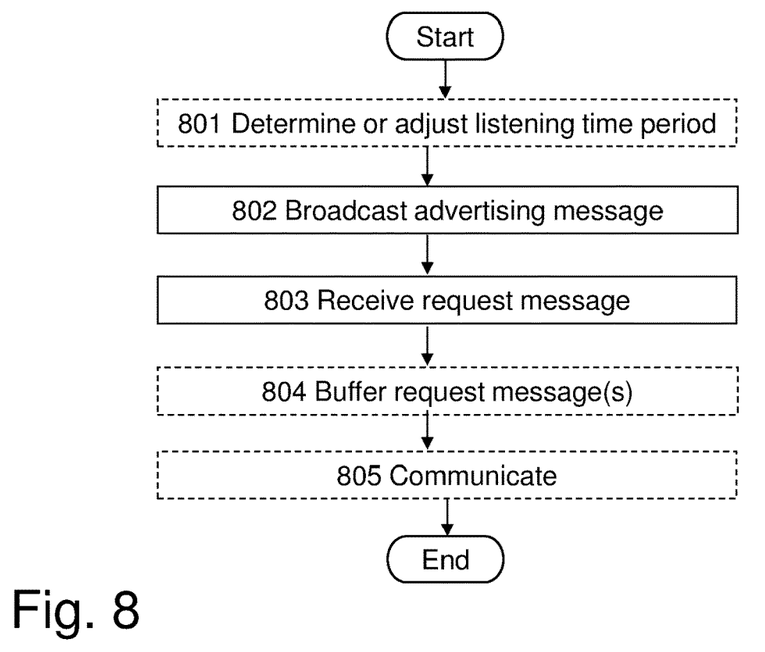
FIG. 8 is a flowchart schematically illustrating embodiments of a method performed by an advertisement responding wireless device.

FIG. 8 is a flow chart schematically illustrating embodiments of a method, performed by an advertising wireless device, e.g. the advertising wireless device 110, for communicating with one or more advertisement responding wireless devices, e.g. the advertisement responding wireless devices 120-1 . . . 120-N over a wireless communication link, such as the wireless communication link 115.

In some embodiments, the wireless communication link 115 is a low power, short range wireless communication link and/or is based on BLE, e.g. is a BLE wireless communication link.

The method comprises the following actions, which actions may be taken in any suitable order and/or be carried out fully or partly overlapping in time when this is possible and suitable.

Action 801

The advertising wireless device 110 may determine or adjusts a listening time period, e.g. the listening time period Δt, based on load and/or interference associated with the wireless communication link 115.

This action may fully or partly correspond to Action 201 above.

Action 802

The advertising wireless device 110 broadcasts an advertising message over the wireless communication link 115.

This action may fully or partly correspond to Action 202 above.

Action 803

The advertising wireless device 110 receives, from an advertisement responding device, e.g. the advertisement responding device 120-1, a request message that was sent by the advertisement responding device 120-1 at a certain point in time in response to the broadcasted advertising message. The certain point in time being randomized within a listening time period, e.g. the listening time period Δt, during which the advertising wireless device 110 listens for a response to the broadcasted advertising message and is able to receive the request message.

The listening time period may be based on a predefined and/or predetermined value.

In some embodiments, the broadcasted advertising message comprises information identifying the listening time period.

This action may fully or partly correspond to Action 203a above.

Action 804

The advertising wireless device 110 may buffer, during the listening time period, said received request message and received additional one or more request messages from one or more additional advertisement responding devices, e.g. the one or more additional advertisement responding devices 120-2 . . . 120-N.

This action may fully or partly correspond to Action 204 above.

Action 805

The advertising wireless device 110 may communicate, after lapse of said listening period and in response to at least one of said buffered request messages, with at least one of the advertisement responding device 120-1 and the one or more additional advertisement responding devices 120-2 . . . 120-N.

This action may fully or partly correspond to Action 205 above.

Figure 9:
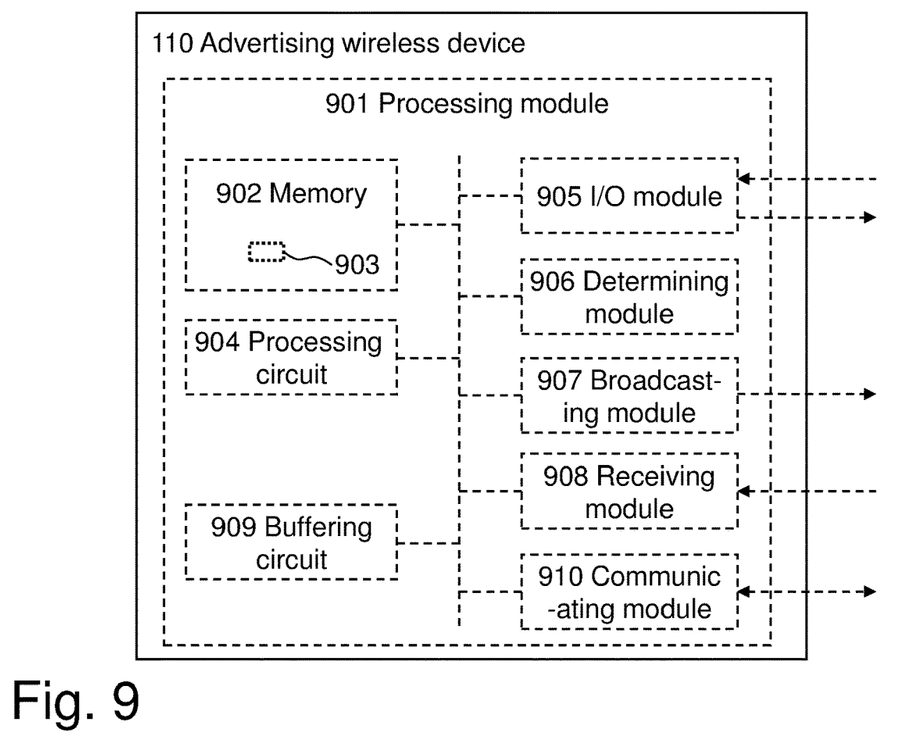
FIG. 9 is a functional block diagram for illustrating embodiments of the advertisement responding wireless device.

FIG. 9 is a schematic block diagram for illustrating embodiments of the advertising wireless device 110 mentioned above in connection with FIG. 8, for communicating with one or more advertisement responding wireless devices 120-1 . . . 120-N over the wireless communication link 115, in particular how the advertising wireless device 110 may be configured to perform the method and actions discussed above in connection with FIG. 8.

The advertising wireless device 110 may comprise a processing module 901, such as a means, one or more hardware modules, including e.g. one or more processors, and/or one or more software modules for performing said methods and/or actions.

The advertising wireless device 110 may further comprise a memory 902 that may comprise, such as contain or store, a computer program 903. The computer program comprises 'instructions' or 'code' directly or indirectly executable by the advertising wireless device 110 so that it performs the said methods and/or actions. The memory 902 may comprise one or more memory units and may be further be arranged to store data, such as configurations and/or applications involved in or for performing functions and actions of embodiments herein.

Moreover, the advertising wireless device 110 may comprise a processing circuit 904 as an exemplifying hardware module and may comprise or correspond to one or more processors. In some embodiments, the processing module 901 may comprise, e.g. 'is embodied in the form of' or 'realized by' the processing circuit 904. In these embodiments, the memory 902 may comprise the computer program 903 executable by the processing circuit 904, whereby the advertising wireless device 110 is operative, or configured, to perform said method and/or actions.

Typically the advertising wireless device 110, e.g. the processing module 901, comprises an Input/Output (I/O) module 905, configured to be involved in, e.g. by performing, any communication to and/or from other units and/or nodes, such as sending and/or receiving information to and/or from other external nodes or devices. The I/O module 905 may be exemplified by an obtaining, e.g. receiving, module and/or a providing, e.g. sending, module, when applicable.

In further embodiments, the advertising wireless device 110, e.g. the processing module 901, may comprise one or more of an determining module 906, an broadcasting module 907, a receiving module 908, a buffering module 909 and a communicating module 910 as exemplifying hardware and/or software module(s). The determining module 906, the broadcasting module 907, the receiving module 908 and the communicating module 909 may be fully or partly implemented by the processing circuit 904.

Therefore, according to the various embodiments described above, the advertising wireless device 110, and/or the processing module 901 and/or the determining module 906 may be operative, or configured, to determine or adjusting the listening time period based on load and/or interference associated with the wireless communication link 115.

Moreover, according to the various embodiments described above, the advertising wireless device 110, and/or the processing module 901 and/or the broadcasting module 907 are operative, or configured, to broadcast the advertising message over the wireless communication link 115.

Further, according to the various embodiments described above, the advertising wireless device 110 and/or the processing module 901 and/or the receiving module 908 are operative, or configured to receive, from the advertisement responding device 120-1, said request message that was sent by the advertisement responding device 120-1 at said certain point in time in response to the broadcasted advertising message.

Furthermore, according to the various embodiments described above, the advertising wireless device 110, and/or the processing module 901 and/or the buffering module 909 may be operative, or configured, to buffer, during the listening time period, said received request message and received additional one or more request messages from said one or more additional advertisement responding devices 120-2 . . . 120-N.

Further, according to the various embodiments described above, the advertising wireless device 110, and/or the processing module 901 and/or the communicating module 909 may be operative, or configured, to communicate, after lapse of said listening period and in response to said at least one of said buffered request messages, with said at least one of the advertisement responding device 120-1 and the one or more additional advertisement responding devices 120-2 . . . 120-N.

Figure 10:
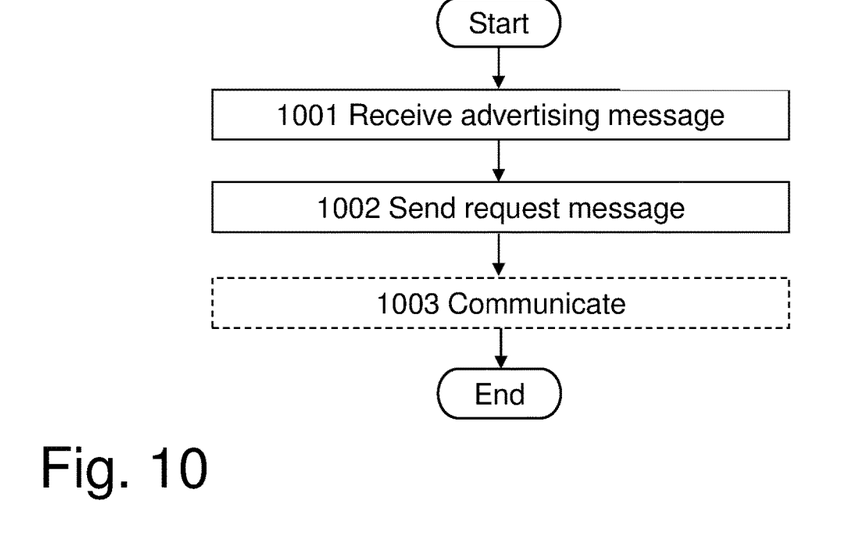
FIG. 10 is a flowchart schematically illustrating embodiments of a method performed by an advertising wireless device.

FIG. 10 is a flow chart schematically illustrating embodiments of a method, performed by an advertisement responding wireless device, e.g. the advertisement responding wireless device 120-1, for communicating with an advertising wireless device, e.g. the advertising wireless device 110 over a wireless communication link, such as the wireless communication link 115.

In some embodiments, the wireless communication link 115 is a low power, short range wireless communication link and/or is based on BLE, e.g. is a BLE wireless communication link.

The method comprises the following actions, which actions may be taken in any suitable order and/or be carried out fully or partly overlapping in time when this is possible and suitable.

Action 1001

The advertisement responding wireless device 120-1 receives, from the advertising device 110, an advertising message broadcasted by the advertising device 110 over the wireless communication link 115.

This action may fully or partly correspond to Action 202 above.

Action 1002

The advertisement responding wireless device 120-1 sends, to the advertising device 110 at a certain point in time, a request message in response to the received advertising message. The certain point in time being randomized within a listening time period, e.g. the listening time period $\Delta t$, during which the advertising wireless device 110 listens for a response to the broadcasted advertising message and is able to receive the request message.

The listening time period may be based on a predefined and/or predetermined value.

In some embodiments, the broadcasted advertising message in Action 1001 comprises information identifying the listening time period.

This action may fully or partly correspond to Action 203a above.

Action 1003

The advertisement responding wireless device 120-1 may communicate with the advertising wireless device 110 based on that the advertising wireless device 110 has received the request message.

This action may fully or partly correspond to Action 205 above.

Figure 11:
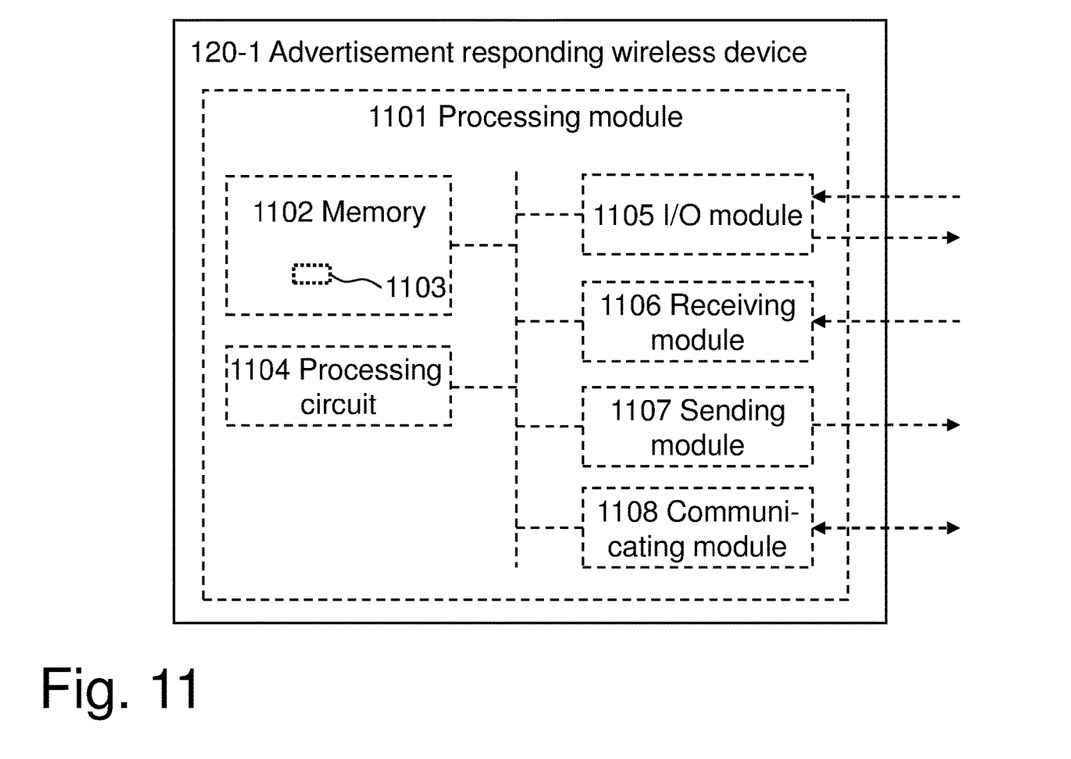
FIG. 11 is a functional block diagram for illustrating embodiments of the advertising wireless device.

FIG. 11 is a schematic block diagram for illustrating embodiments of the advertisement responding wireless device 120-1 for communicating with the advertising wireless device 110 over the wireless communication link 115, in particular how the advertisement responding wireless device 120-1 may be configured to perform the method and actions discussed above in connection with FIG. 10.

The advertisement responding wireless device 120-1 may comprise a processing module 1101, such as a means, one or more hardware modules, including e.g. one or more processors, and/or one or more software modules for performing said methods and/or actions.

The advertisement responding wireless device 120-1 may further comprise a memory 1102 that may comprise, such as contain or store, a computer program 1103. The computer program comprises 'instructions' or 'code' directly or indirectly executable by the advertisement responding wireless device 120-1 so that it performs the said methods and/or actions. The memory 1102 may comprise one or more memory units and may be further be arranged to store data, such as configurations and/or applications involved in or for performing functions and actions of embodiments herein.

Moreover, the advertisement responding wireless device 120-1 may comprise a processing circuit 1104 as an exemplifying hardware module and may comprise or correspond to one or more processors. In some embodiments, the processing module 1101 may comprise, e.g. 'is embodied in the form of' or 'realized by' the processing circuit 1104. In these embodiments, the memory 1102 may comprise the computer program 1103 executable by the processing circuit 1104, whereby the advertisement responding wireless device 120-1 is operative, or configured, to perform said method and/or actions.

Typically the advertisement responding wireless device 120-1, e.g. the processing module 1101, comprises an Input/Output (I/O) module 1105, configured to be involved in, e.g. by performing, any communication to and/or from other units and/or nodes, such as sending and/or receiving information to and/or from other external nodes or devices. The I/O module 1105 may be exemplified by an obtaining, e.g. receiving, module and/or a providing, e.g. sending, module, when applicable.

In further embodiments, the advertisement responding wireless device 120-1, e.g. the processing module 1101, may comprise one or more of an receiving module 1106, a sending module 1107 and a communicating module 1108, as exemplifying hardware and/or software module(s). In some embodiments, the receiving module 1106, the sending module 1107 and the communicating module 1108, may be fully or partly implemented by the processing circuit 1104.

Therefore, according to the various embodiments described above, the advertisement responding wireless device 120-1, and/or the processing module 1101 and/or the receiving module 1106 are operative, or configured, to receive, from the advertising device 110, said advertising message broadcasted by the advertising device 110 over the wireless communication link 115.

Moreover, according to the various embodiments described above, the advertisement responding wireless device 120-1, and/or the processing module 1101 and/or the sending module 1107 are operative, or configured, to send, to the advertising device 110 at said certain point in time, said request message in response to the received advertising message.

Further, according to the various embodiments described above, the advertisement responding wireless device 120-1, and/or the processing module 1101 and/or the communicating module 1107 may be operative, or configured, to communicate with the advertising wireless device 110 based on that the advertising wireless device 110 has received the request message.

Figure 12A:
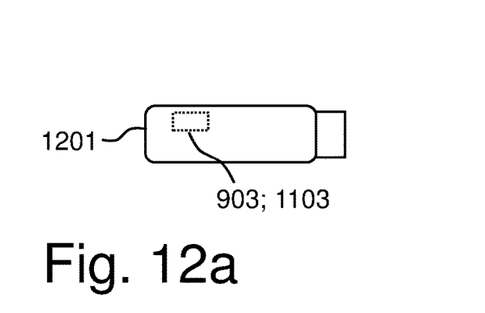
FIGS. 12a-c are schematic drawings illustrating embodiments relating to computer program products and computer programs to cause the advertisement responding wireless device and/or advertising wireless device to perform method actions.
Figure 12B:
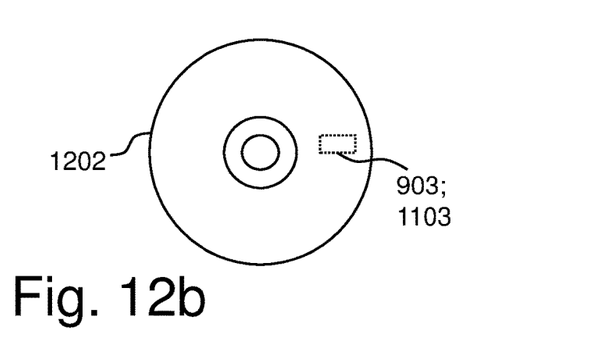
Figure 12C:
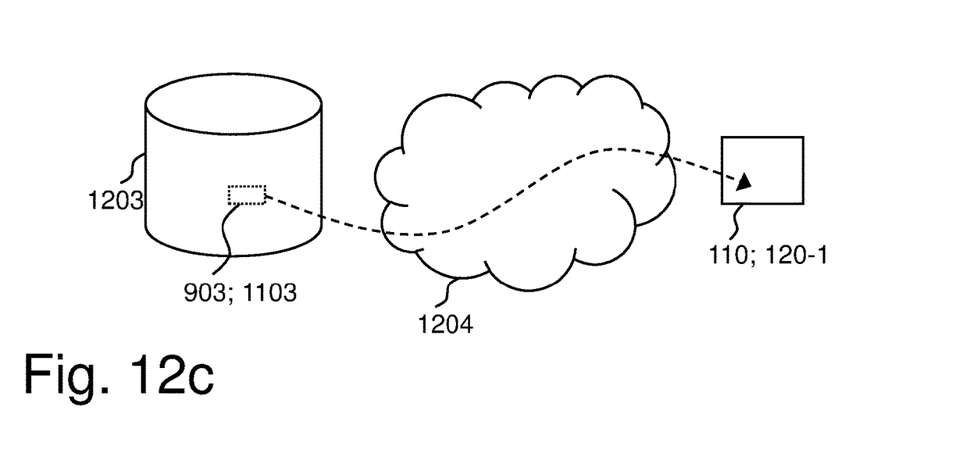

FIGS. 12a-c are schematic drawings illustrating embodiments relating to a computer program that may be any one of the computer programs 903, 1103 and that comprises instructions that when executed by the processing circuits 904, 1104, respectively and/or the processing modules 901, 1101 respectively, causes the advertising wireless device 110 and/or the advertisement responding wireless device 120-1, to perform as described above.

In some embodiments there is provided a data carrier, e.g. a computer program product, comprising any one or both of the computer programs 903, 1103. The data carrier may be one of an electronic signal, an optical signal, a radio signal, and a computer readable medium. Any one, some or all of the computer programs 903, 1103 may thus be stored on the computer readable medium. By data carrier may be excluded a transitory, propagating signal and the data carrier may correspondingly be named non-transitory data carrier. Non-limiting examples of the data carrier being a computer-readable medium is a memory card or a memory stick 1201 as in FIG. 12*a*, a disc storage medium 1202 such as a CD or DVD as in FIG. 12*b*, a mass storage device 1203 as in FIG. 12*c*. The mass storage device 1203 is typically based on hard drive(s) or Solid State Drive(s) (SSD). The mass storage device 1203 may be such that is used for storing data accessible over a computer network 1204, e.g. the Internet or a Local Area Network (LAN).

Any one, some or all of the computer programs 903, 1103 may furthermore be provided as a pure computer program or comprised in a file or files. The file or files may be stored on the computer-readable medium and e.g. available through download e.g. over the computer network 1204, such as from the mass storage device 1203 via a server. The server may e.g. be a web or File Transfer Protocol (FTP) server. The file or files may e.g. be executable files for direct or indirect download to and execution on the advertising wireless device 110 and/or the advertisement responding wireless device 120-1. The file or files may also or alternatively be for intermediate download and compilation involving the same or another processor to make them executable before further download and execution causing the advertising wireless device 110 and/or the advertisement responding wireless device 120-1 to perform the method(s) as described above.

Note that any processing module(s) mentioned in the foregoing may be implemented as a software and/or hardware module, e.g. in existing hardware and/or as an Application Specific integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the advertising wireless device 110 and/or the advertisement responding wireless device 120-1 to be configured to and/or to perform the above-described methods, respectively.

Many details of examples above relate to BLE, i.e. are in a particular wireless technology context, and/or may have a specific meaning in such context, as recognized by the skilled person. However, embodiments herein are not limited to only such context(s) as used in the examples.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that any enumerating terminology used such as first network node, second network node, first wireless device, second wireless device, etc. and similar, as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit string.

As used herein, the expression "in some embodiments" has been used to indicate that the features of the embodiment described may be combined with any other embodiment disclosed herein.

As used herein, the expression "transmit" and "send" are typically interchangeable. These expressions as such may include transmission by broadcasting, unicasting, group-casting and the like. In this context, a transmission by broadcasting may be received and decoded by any authorized device within range. In case of uni-casting, one specifically addressed device may receive and encode the transmission. In case of group-casting, e.g. multi-casting, a group of specifically addressed devices may receive and decode the transmission.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by an advertising wireless device, for communicating with one or more advertisement responding wireless devices over a wireless communication link, the method comprising:
   broadcasting an advertising message over the wireless communication link;
   receiving, from an advertisement responding device, a request message that was sent by the advertisement responding device at a certain point in time in response to the broadcasted advertising message, the certain point in time being randomized within a listening time period during which the advertising wireless device listens for a response to the broadcasted advertising message and is able to receive the request message; and
   determining or adjusting the listening time period based on interference associated with the wireless communication link, wherein the broadcasted advertising message comprises information identifying the listening time period.

2. The method of claim 1, wherein the wireless communication link is a low power, short range wireless communication link, and/or is based on BLUETOOTH Low Energy.

3. The method of claim 1, wherein the listening time period is based on at least one of a predefined and/or predetermined value.

4. The method of claim 1, wherein the listening time period is further based on load associated with the wireless communication link.

5. The method of claim 1, further comprising:
   receiving additional one or more request messages from one or more additional advertisement responding devices; and buffering, during the listening time period, the received request message and the received additional one or more request messages.

6. The method of claim 5, further comprising communicating, after lapse of the listening period and in response to at least one of the buffered request messages, with at least one of the advertisement responding device and/or the one or more additional advertisement responding devices.

7. A method, performed by an advertisement responding wireless device, for communicating with an advertising wireless device over a wireless communication link, the method comprising:
   receiving, from the advertising device, an advertising message broadcasted by the advertising device over the wireless communication link; and
   sending, to the advertising device at a certain point in time, a request message in response to the received advertising message, the certain point in time being randomized within a listening time period during which the advertising wireless device listens for a response to the broadcasted advertising message and is able to receive the request message, wherein the listening time period is based on interference associated with the wireless communication link, wherein the received advertising message comprises information identifying the listening time period.

8. The method of claim 7, wherein the wireless communication link is at least one of a low power, short range wireless communication link and/or based on BLUETOOTH Low Energy.

9. The method of claim 7, wherein the listening time period is based on at least one of a predefined and/or predetermined value.

10. The method of claim 7, further comprising communicating with the advertising wireless device based on the advertising wireless device having received the request message.

11. An advertising wireless device for communicating with one or more advertisement responding wireless devices over a wireless communication link, the advertising wireless device comprising:
   processing circuitry;
   memory containing instructions executable by the processing circuitry whereby the advertising wireless device is operative to:
      broadcast an advertising message over the wireless communication link; and
      receive, from an advertisement responding device, a request message that was sent by the advertisement responding device at a certain point in time in response to the broadcasted advertising message, the certain point in time being randomized within a listening time period during which the advertising wireless device listens for a response to the broadcasted advertising message and is able to receive the request message, wherein the listening time period is based on interference associated with the wireless communication link, wherein the broadcasted advertising message comprises information identifying the listening time period.

12. The advertising wireless device of claim 11, wherein the wireless communication link is at least one of a low power, short range wireless communication link and/or based on BLUETOOTH Low Energy.

13. The advertising wireless device of claim 11, wherein the listening time period is based on at least one of a predefined and/or predetermined value.

14. The advertising wireless device of claim 11, where the instructions are such that the advertising wireless device is further configured to determine or adjust the listening time period based on load associated with the wireless communication link.

15. An advertisement responding wireless device for communicating with an advertising wireless device over a wireless communication link, the advertisement responding wireless device comprising:
   processing circuitry;
   memory containing instructions executable by the processing circuitry whereby the advertisement responding wireless device is operative to:
      receive, from the advertising device, an advertising message broadcasted by the advertising device over the wireless communication link; and
      send, to the advertising device at a certain point in time, a request message in response to the received advertising message, the certain point in time being randomized within a listening time period during which the advertising wireless device listens for a response to the broadcasted advertising message and is able to receive the request message,
   wherein the listening time period is based on interference associated with the wireless communication link, and
   wherein the advertising message comprises information identifying the listening time period.

16. The advertisement responding wireless device of claim 15, wherein the wireless communication link is at least one of a low power, short range wireless communication link and/or based on BLUETOOTH Low Energy.

17. The advertisement responding wireless device of claim 15, wherein the listening time period is based on at least one of a predefined and/or predetermined value.

* * * * *